Sept. 22, 1970  A. F. GAWRON ET AL  3,530,350
POWER SYSTEM FOR PORTABLE ELECTRIC TOOLS INCLUDING
INDUCTION-TYPE ELECTRIC MOTOR WITH ASSOCIATED
SOLID STATE FREQUENCY GENERATOR
Original Filed July 18, 1966  4 Sheets-Sheet 2

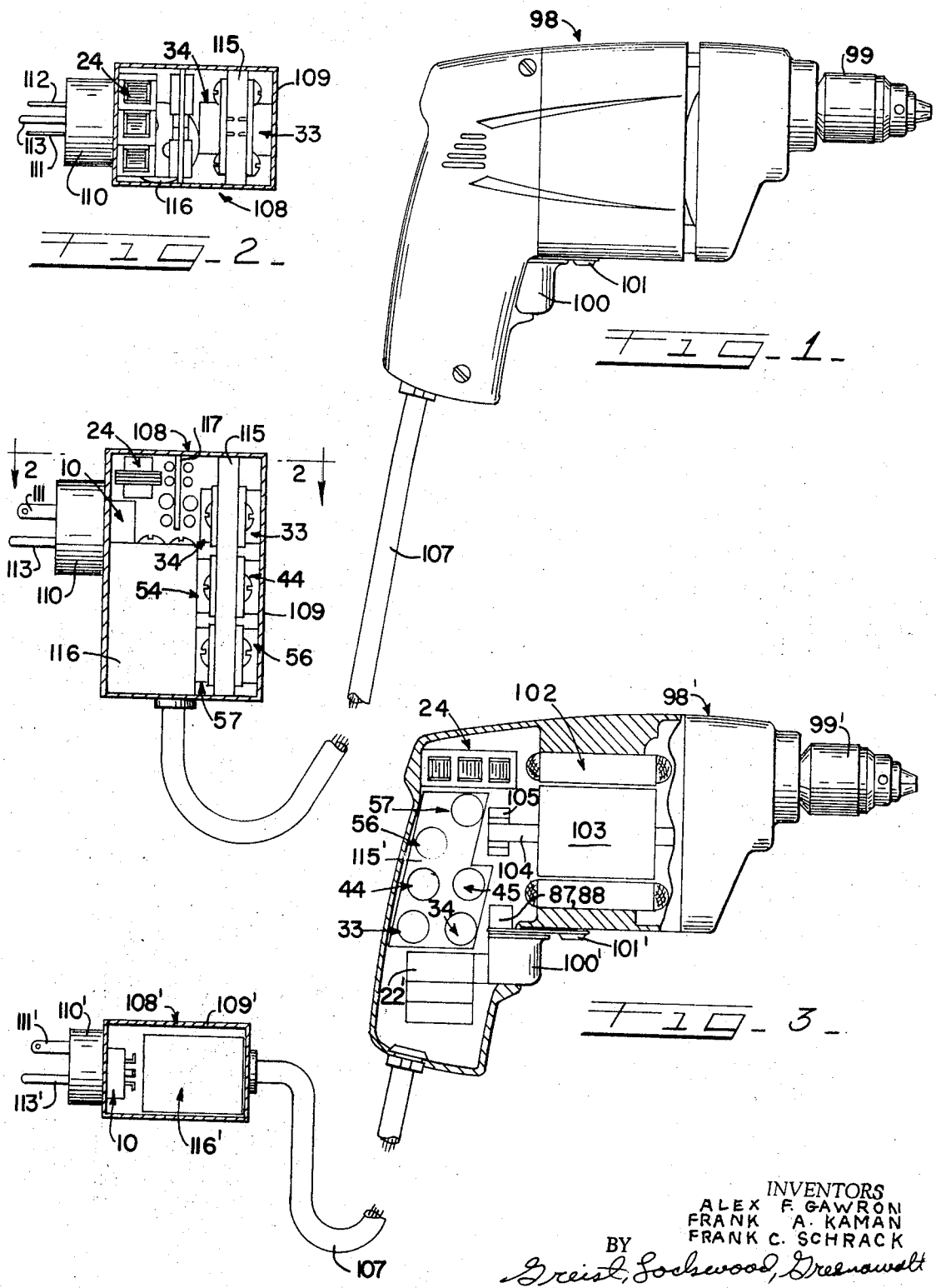

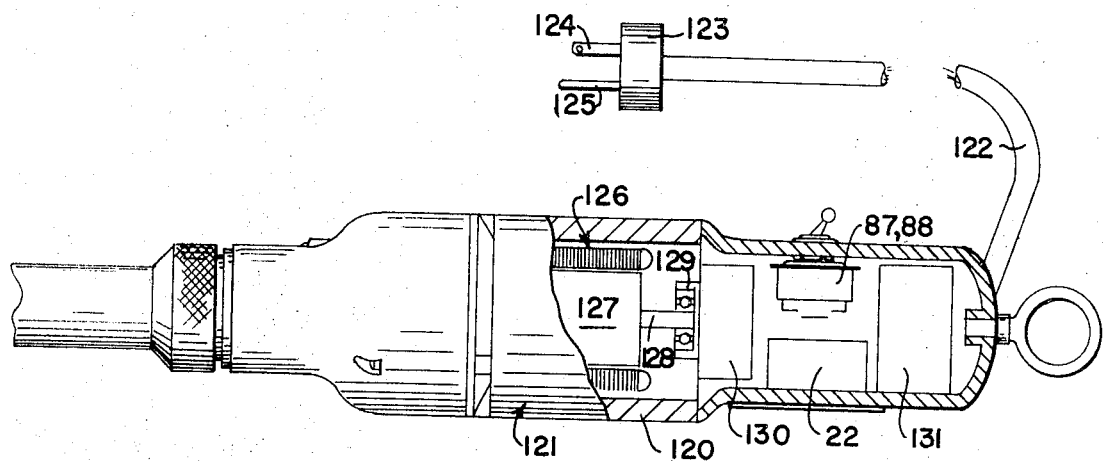

FIG. 4.

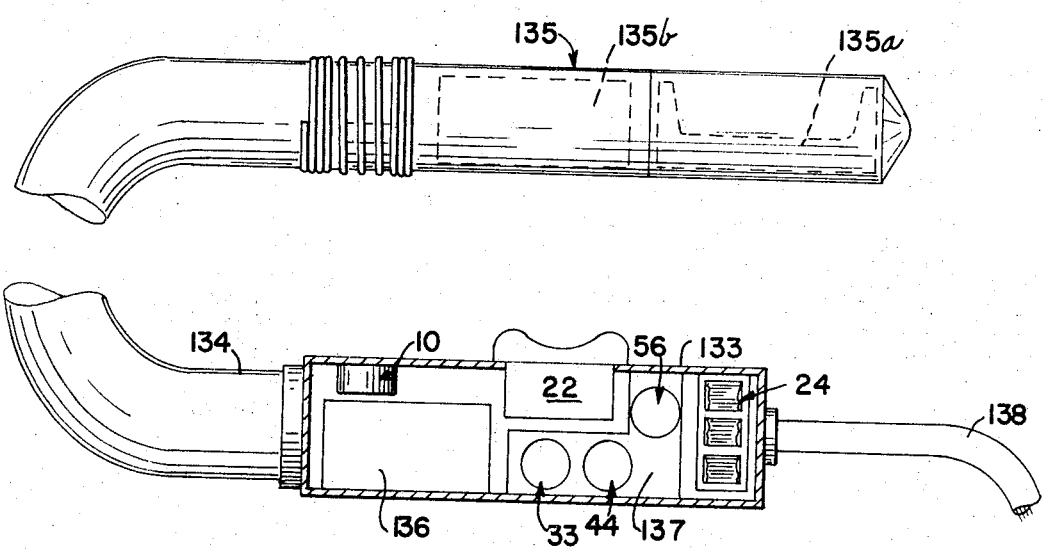

FIG. 5.

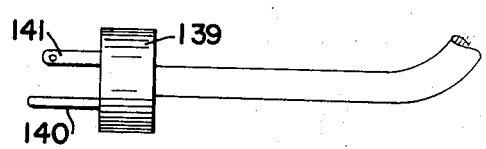

TRANSISTORS

| 33 | ON  | ON  | ON  | OFF | OFF | OFF |
|----|-----|-----|-----|-----|-----|-----|
| 34 | OFF | OFF | OFF | ON  | ON  | ON  |
| 44 | OFF | OFF | ON  | ON  | ON  | OFF |
| 45 | ON  | ON  | OFF | OFF | OFF | ON  |
| 56 | ON  | OFF | OFF | OFF | ON  | ON  |
| 57 | OFF | ON  | ON  | ON  | OFF | OFF |

←——— ONE CYCLE ———→

FIG. 11.

INVENTORS
ALEX F. GAWRON
FRANK A. KAMAN
FRANK C. SCHRACK
BY
Greist, Lockwood, Greenawalt
& Dewey
ATT'YS.

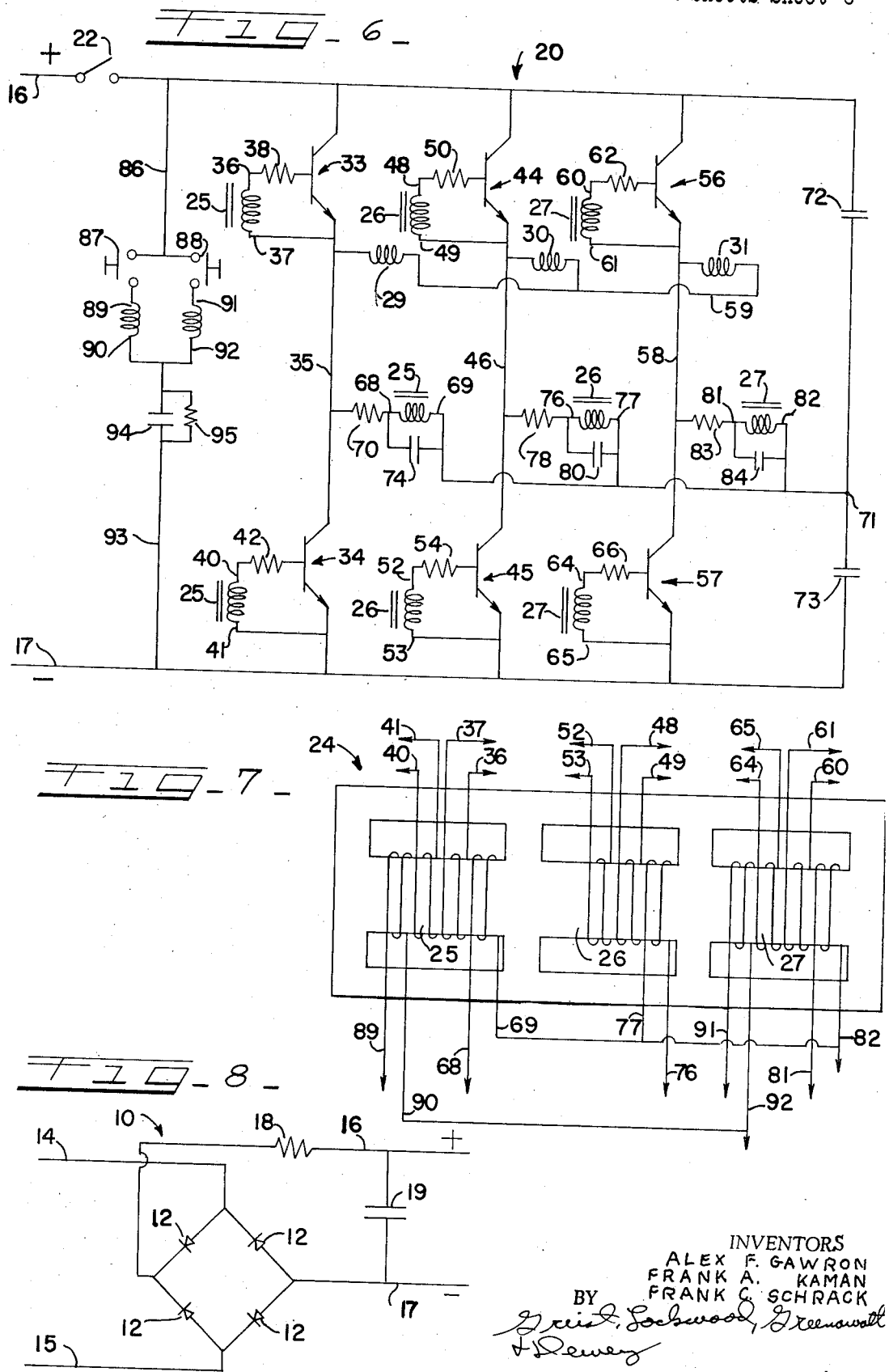

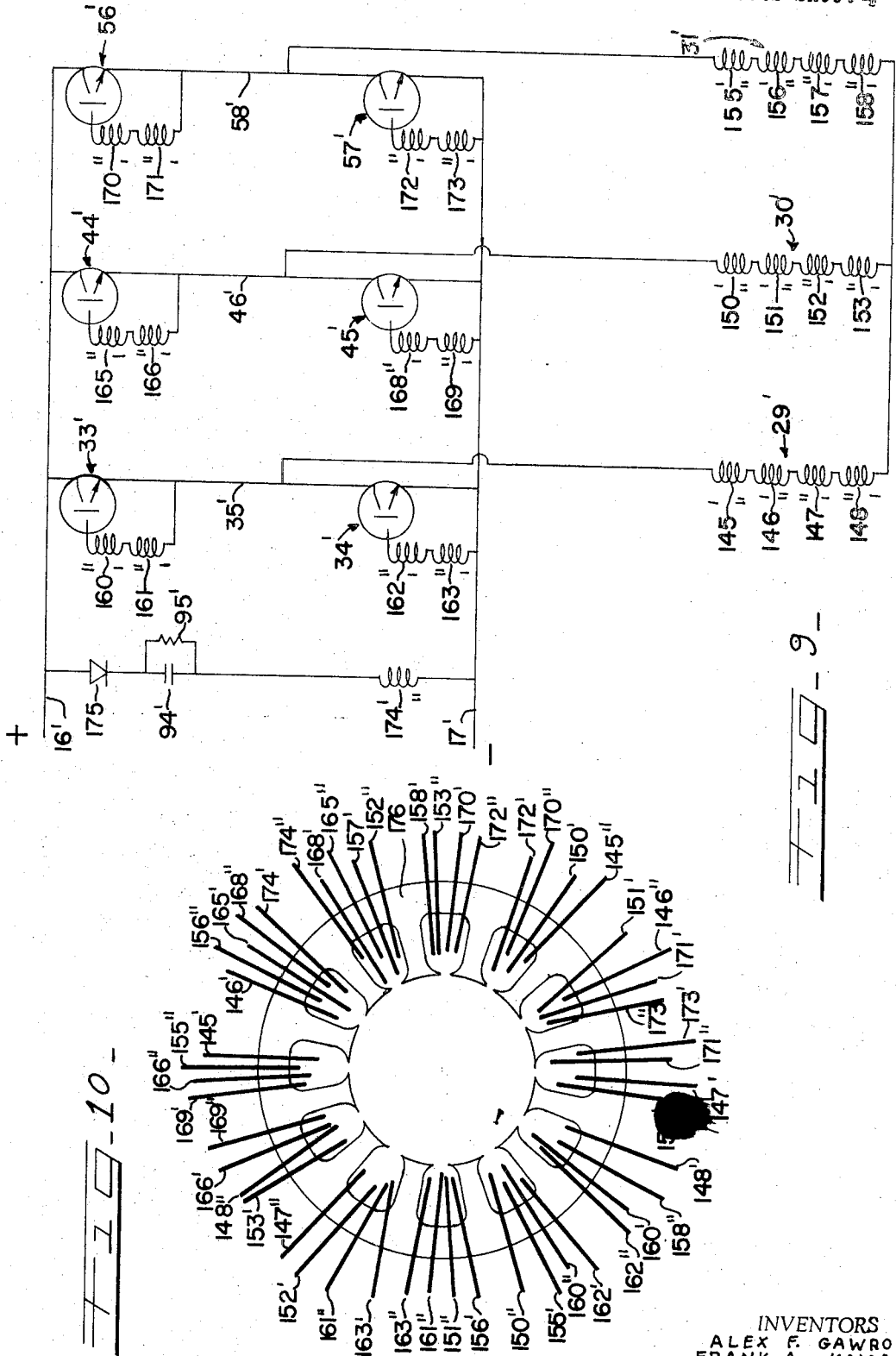

United States Patent Office

3,530,350
Patented Sept. 22, 1970

3,530,350
POWER SYSTEM FOR PORTABLE ELECTRIC TOOLS INCLUDING INDUCTION-TYPE ELECTRIC MOTOR WITH ASSOCIATED SOLID STATE FREQUENCY GENERATOR
Alex F. Gawron, Chicago, Frank A. Kaman, Prospect Heights, and Frank C. Schrack, Chicago, Ill., assignors to Skil Corporation, Chicago, Ill., a corporation of Delaware
Continuation of application Ser. No. 566,103, July 18, 1966. This application Jan. 3, 1969, Ser. No. 791,864
Int. Cl. H02p 7/62
U.S. Cl. 318—227          16 Claims

ABSTRACT OF THE DISCLOSURE

The power system includes an induction-type motor with a solid state frequency generator including pairs of transistors arranged in push-pull relation, the sequence of switching being controlled by a saturable core transformer. The power system in its entirety is mounted within a portable tool.

---

This is a continuation of application Ser. No. 566,103, filed July 18, 1966, and now abandoned.

This invention relates in a general way to portable electric tools, and more particularly to a new and improved power system for such tools.

By way of background, portable power tools can be divided into several categories based on the type of power employed, two main categories being pneumatically powered tools and electrically powered tools. Pneumatically powered tools possess several advantages over electrically powered tools as will be mentioned below, and during the past twenty years the former have come into widespread use and have substantially replaced electrically powered tools in some areas, such as assembly line work. Pneumatically operated tools are desirable since they are quite durable and efficient in operation, require less maintenance, and are not damaged when stalled. However, pneumatically operated tools have disadvantages over electrically powered tools in that the former require a source of compressed air, which is not always available, are noisy in operation, and require continuous oil mist lubrication that tends to contaminate the work area. Also, the air exhaust of pneumatic tools is a nuisance.

Electrically powered portable tools are for the most part powered by universal or series type electric motors. A power tool equipped with a series type electric motor does not provide as much power output as a pneumatic tool of generally the same size or weight. Such electrically powered tools are not as durable as pneumatically operated tools since the brush life in series motors is generally limited to only a few hundred hours, at which time the brushes must be replaced. Also the armatures in such motors are constructed in a relatively fragile fashion and contain a commutator which has a limited life. Because of brush wear on the commutator or breakage of coil leads, armatures must be replaced after only several hundred hours of operation. By comparison, pneumatically operated tools are much more durable but again are limited by rotor vane wear. Of course, electrically powered tools have advantages over pneumatic tools in that the former are rather quiet in operation and can be operated from line current which is as a power source, more readily available.

A.C., high-cycle induction motors, which are much more reliable and rugged than universal or series type motors, have been used extensively in the past in portable power tools, but have since been largely supplanted by pneumatic motors in recent years. This is primarily because such induction motors cannot be directly powered from normally available line current, but require elaborate and cumbersome power supply and distribution systems. A.C. normal cycle induction motors, as opposed to the aforementioned high-cycle induction motors, are not used in power tools because the resulting tool is too large and heavy for portability. A motor generator system could technically be built into or as a part of the tool to provide the capability of operating from normal line current, but this is obviously not practical.

From the foregoing, it will be appreciated that it is desirable to provide an electrically powered portable tool which will have a power output comparable to a pneumatic tool of approximately the same size or weight, which will have a long life, which will be efficient, and which will be durable and substantially maintenance free in operation. A primary object of the present invention is to achieve this end by the provision of a new and improved electrical power system for portable power tools.

Another object of the present invention is to provide a new and improved electrical power system for portable electric tools, which system includes a polyphase induction-type motor and a frequency generator uniquely associated therewith.

Another object of the present invention is to provide a new and improved electrical power system for portable electric tools, which system includes a brushless motor that has the desirable characteristics of a universal motor.

Still another object of the present invention is to provide a power system of the type mentioned for a power tool assembly including a portable electric tool, and electric plug unit and a cord connecting the former with the latter, wherein all of the components of the power system are mounted within such power tool assembly.

Another object of the invention is to provide an electrical power system for a portable power tool assembly, which system includes an induction-type motor and uniquely associated means of light and compact construction for efficiently powering such motor from conventional line current.

Still another object of the present invention is the provision of an electrical power system which makes possible the efficient use of an induction-type motor in a portable electric tool.

These and other objects and advantages of the present invention will become apparent from the following specification disclosing preferred embodiments of the invention wherein:

FIG. 1 is a side view, partially in elevation and partially in section, of a portable electric drill assembly illustrating one embodiment of the present invention;

FIG. 2 is a section taken along the line 2—2 of FIG. 1;

FIG. 3 is a side view, partially in elevation and partially in section, of a portable electric drill assembly illustrating another embodiment of the present invention;

FIG. 4 is a side elevational view, partly broken away for better illustration, of an electric screw driver including still another embodiment of the present invention;

FIG. 5 is a plan view of a vibrating tool, a portion of the tool being shown in section for better illustration, showing another embodiment of the present invention;

FIG. 6 is a circuit diagram showing the frequency generator and associated motor stator windings forming a part of the present invention;

FIG. 7 is a diagrammatic view of the transformer forming part of the frequency generator of the power system;

FIG. 8 is a circuit diagram of rectifying means employed to convert A.C. line current to suitable D.C.;

FIG. 9 is a circuit diagram showing certain modifications of the power system of the invention;

FIG. 10 is a diagrammatic view showing the motor stator and the arrangement of the various coils in the FIG. 9 circuit; and FIG. 11 is a table showing the sequence of switching for the transistors of the frequency generator of the power system.

The power system of this invention is shown diagrammatically in FIGS. 6, 7 and 8. Referring now to FIG. 8, which shows rectifying means generally designated 10, such means will be seen to include a full-wave bridge rectifier consisting of four diodes 12 connected across lines 14 and 15; these lines represent, for example, conventional single phase line current which, in the United States, is in the order of 117 volts at 60 cycles per second. Extending from the bridge rectifier are D.C. lines 16 and 17, the former being positive and the latter being negative. A resistor 18 is connected in line 16 and a capacitor 19 is connected across the lines 16, 17 in parallel with the bridge rectifier. It will be apparent that the rectifying means 10 converts the A.C. line current to D.C. in the lines 16 and 17. It will be understood that the values of resistor 18 and capacitor 19 can be changed to accommodate input current of a voltage different from 117 volts, as might be encountered in foreign countries. It will also be understood that a suitable D.C. current could be applied to the lines 14, 15, in which case D.C. current would still be supplied in the lines 16, 17.

FIG. 6 shows a power system 20 primarily consisting of a frequency generator having a D.C. input or supply consisting of the aforementioned lines 16 and 17. An on-off switch 22 may be provided in one of the D.C. input lines, such as the line 16. The power system 20 is associated with and controlled by a saturable core transformer 24 as best illustrated in FIG. 7, such transformer consisting of three legs or phases 25, 26 and 27. In FIG. 6, each leg of the transformer is shown in three separate sections to facilitate illustration of the associated components. Still referring to this figure of the drawings, the stator windings of a polyphase induction-type motor are designated 29, 30, 31. The polyphase load or induction-type motor with which the present invention is associated is not to be limited to any particular number of phases, three phases being preferable and being shown for purposes of illustration. Alternating current is generated in proper phase relationship in the stator of the induction-type motor including the windings 29, 30 and 31 by the frequency generator which may consist of pairs of solid state switch devices, such as transistors, arranged in push-pull relation. By solid state switch devices is meant devices that operate on the principle of allowing flow or blocking of current depending on boundary relationships such as are exhibited by semiconductors or transistors.

A first pair of transistors 33, 34 of the NPN type are connected across D.C. input lines 16 and 17 and are connected together in emitter to collector relation by a line 35, which line is connected to the motor stator coil 29. It will be understood that the frequency generator of the power supply can be adapted to use a pair of PNP type transistors as well as a pair of transistors consisting of one NPN type transistor and one PNP type transistor, for each phase. Transistor 33 is switched either on or off by a secondary transformer coil 36–37, the end of the coil represented by 37 being connected to the line 35 and the end of the secondary transformer coil indicated as 36 being connected to the base of the transistor through a resistor 38. In like manner, transistor 34 is switched either on or off by a secondary transformer coil 40–41, the end 41 being connected to a common connection between the emitter of this transistor and the line 17 and the end 40 being connected to the base of the transistor through a resistor 42.

Alternating current is generated in the stator winding 30 of the motor by another pair of transistors 44, 45. These transistors are connected across the D.C. input lines 16 and 17 and are connected together in emitter to collector relation by a line 46, which line is connected to one end of the motor winding 30. Transistor 44 is switched either on or off by a secondary transformer coil 48–49 connected in series with a resistor 50 between the line 46 and the base of the transistor 44. Similarly, transistor 45 is controlled by a secondary transformer winding 52–53 connected in series with a resistor 54 between the base of transistor 45 and a connection common to the emitter of this transistor and the D.C. line 17.

Alternating current is generated in stator winding 31 by a pair of transistors 56, 57 connected across the D.C. input lines and connected together in emitter to collector relation by a line 58, the latter being connected to one end of the stator winding 31. The other end of this stator winding is connected to a line 59 common to the other two stator windings. Transistor 56 is controlled or switched to either conducting or non-conducting condition by a secondary transformer winding 60–61 connected in series with a resistor 62 between the base of transistor 56 and the line 58. In like manner, transistor 57 is switched either on or off by a secondary transformer winding 64–65 connected in series with a resistor 66 between the base of transistor 57 and between a connection common to the emitter of the transistor 57 and the D.C. line 17.

Secondary transformer coils 36–37 and 40–41, which are each wound on the leg 25 of the transformer as seen in FIG. 7, are controlled from a primary transformer winding 68–69 also wound on the leg 25 of the transformer. The end of this coil or winding represented at 68 is connected through a resistor 70 to line 35 which is connected between the transistors 33 and 34, and the other end of this coil represented at 69 is connected to a junction 71 in a line connecting capacitors 72, 73 across the D.C. input lines. Capacitors 72, 73 smooth or filter the voltage at junction 71 so the same is always approximately one half the applied input voltage. A capacitor 74 is connected in parallel relation with the primary transformer winding 68–69. The capacitor 74 prevents an overlap between the conducting paths which are set up by the alternately conducting transistors 33, 34. In other words, the capacitor 74 slows down the rate of change between one conductive path and the other, as will be referred to hereinbelow.

Secondary transformer coils 48–49 and 52–53 are controlled by primary transformer winding or coil 76–77, all of these coils being wound on the leg 26 of the saturable core transformer 24. The end of this winding represented by numeral 76 is connected to the line 46 through a resistor 78, and the other end of this winding represented at 77 is connected to the line which extends to the junction 71. A capacitor 80 is connected in parallel with the transformer coil 76–77, this capacitor serving to prevent overlap of the conductive paths set up by the alternate switching of transistors 44, 45.

Secondary transformer windings 60–61 and 64–65 are controlled from a primary transformer winding 81–82, all of these coils being wound on the leg 27 of the transformer 24. The end of this winding represented by 81 is connected to the line 58 through a resistor 83, the other end 82 of this coil being connected to the line which extends to the junction 71. A capacitor 84 is connected in parallel with the main transformer coil 81–82 to prevent overlap between the conductive paths set up by the alternately switched transistors 56, 57.

The power system 20 includes a starting circuit consisting of a line 86 connecting the D.C. line 16 to a conmon connection between a forward starting switch 87 and a reverse starting switch 88. These switches are connected to respective forward and reverse starting coils 89–90 and 91–92. As noted in FIG. 7, coil 89–90 is wound on leg 25 of the transformer and coil 91–92 is wound on leg 27 of the transformer. The coil ends 90, 92 are connected to a common connection which is in turn connected to the D.C. line 17 by a line 93 having a capacitor 94 and parallel arranged resistor 95 connected therein.

Briefly, the operation of the above described power system is as follows:

To start the rotor of a motor including the stator windings 29, 30, and 31, the switch 22 is closed followed by closing of either the forward start switch 87 or the reverse start switch 88, depending on the direction of rotation desired. Assuming that the forward switch 87 is momemtarily closed, a pulse of current flows through the forward starting coil 89–90 on the transformer leg 25. This pulse initiates the transformer fluxes so that the desired direction of self-oscillation is established. If reverse starting switch 88 had been closed, a pulse of current would have flowed through coil 91–92 to set up fluxes in the reverse direction thereby in turn establishing self-oscillation in a reverse direction. The capacitor 94 passes a predetermined pulse through the starting coil, and the parallel connected resistor 95 causes discharge of this capacitor for the next starting cycle.

The six transistors in the frequency generator are operated as on-off switches. That is, when a transistor is biased on, sufficient base current is provided to maintain the transistor in a saturated condition, i.e., easy current conduction from collector to emitter, and when a transistor is biased off, the base drive voltage is reversed, so that the transistor is capable of blocking the applied voltage, i.e., essentially zero current from collector to emitter.

The transformer and its associated circuitry responds to the voltages established by the transistors and in turn controls these transistors. Each phase of the transformer operates on a magnetic saturation principle. By way of illustration, when transistor 33 is on, the primary coil 68–69 of leg 25 of the saturable core transformer has essentially a square wave applied to it, and the magnetic flux in this leg changes in approximately a linear manner. When the square wave is applied to this leg of the transformer, a flux is induced in the secondary windings 36–37 and 40–41 thereby impressing a positive voltage to the base transistor 33 for biasing it on and impressing a negative voltage to the base of transistor 34 for biasing it off.

When the primary leg 25 becomes saturated with flux, the output in the secondary transformer windings decrease, thereby diminishing the bias at the base of the transistor 33 tending to turn the same off, which diminishes the voltage applied to the primary winding of the transformer leg 25. This diminishes the ampere turns in this primary coil section thereby causing the flux in leg 25 to diminish. This diminution of flux in the leg 25 initiates voltages in the secondary transformer windings, which voltages are of opposite polarity to the voltages mentioned above, thereby causing transistor 34 to be biased on and transistor 33 to be biased off. This reversal of the conducting conditions of the transistors 33, 34 impresses a voltage on the primary winding of the leg 25 which is opposite to that mentioned above and now the flux in this leg of the transformer is driven to saturation in the opposite direction whereupon another cycle is commenced.

It will be understood that the various transformer windings serve to switch the transistors from their different conducting conditions to establish a three phase, high frequency, alternating current in the stator windings 29–31 so as to operate the induction-type motor.

As these windings are connected to the frequency generator only at their opposite ends, 100% utilization of such windings is achieved. The transistor switching sequence for one cycle of operation is shown in FIG. 11. The transformer 24, which has the various phases thereof magnetically coupled with each other, serves as the sole means for controlling sequence of switching of the transistors and in so doing also serves to synchronize and properly space the phases of alternating current. For a more detailed explanation of the frequency generator and associated induction-type motor, reference may be had to Gawron application Ser. No. 566,101, now Pat. No. 3,424,962 filed on even date herewith.

One embodiment of the power system of this invention, which includes the above described motor, which may be termed a universal brushless motor as it does not have brushes and can be operated from either D.C. or A.C. at the lines 14, 15, is shown in the power tool assembly illustrated in FIGS. 1 and 2. This power tool assembly includes a power tool in the form of an electric drill 98, for example, which drill includes the usual spindle 99, an operating trigger 100 and a forward and reverse switch lever 101. It will be understood that the drill 98 includes in induction-type motor shown more or less diagrammatically in FIG. 3, such motor having a stator 102 consisting of windings 29–31 described above. The motor further includes a rotor 103 mounted on a shaft 104, the ends of which are suitably journaled in bearings, one bearing being designated as 105. It will also be understood that trigger 100 is connected to switch 22 and lever 101 to the switches 87, 88, as shown in FIG. 3.

The power tool assembly of FIGS. 1 and 2 further includes an electric cord 107 connecting the various stator windings with a plug unit 108 consisting of a hollow, box-like housing 109 mounting a plug 110. The plug 110 supports the usual prongs 111, 112 as well as a ground prong 113 for connecting with single phase, alternating current which may be in the order of 117 volts, 60 cycles per second, i.e., so-called line or house current.

The power system shown in FIGS. 6–8 lends itself to miniaturization. In the arrangement shown in FIGS. 1 and 2 all of the electronic components of the power system, except of course the stator windings, are mounted within the plug unit housing 109. The various transistors are mounted on a support plate 115. One of the larger capacitors is represented at 116. Miscellaneous capacitors and resistors are supported on a partition plate 117.

FIG. 3 shows a similar power tool assembly with another embodiment of the power system of the present invention incorporated therein. In FIG. 3, the parts of the power tool assembly corresponding to the power tool assembly shown in FIGS. 1 and 2 are indicated by the prime form of numeral. In this embodiment, only the full-wave bridge rectifier 10 and one or more of the larger capacitors are mounted within the housing 109' of the plug unit 108', thereby allowing the latter to be somewhat smaller in construction than the plug unit shown in FIGS. 1 and 2. In this embodiment, the other electronic components and the saturable core transformer 24 are mounted within the tool housing itself. As noted the transistors are mounted on a plate 115'. The miscellaneous resistors and capacitors may be mounted either within the housing of the tool 98' or within the housing of the plug unit 108' as space requirements dictate.

The embodiment of the present invention shown in FIG. 4 is mounted within the housing 120 of a power screw driver 121 having a cord 122 connecting the screw driver with an ordinary plug unit 123 including a pair of prongs 124 and a ground prong 125. The screw driver includes an induction-type motor having a stator 126 defined by the stator windings 29–31 referred to above The motor includes a rotor 127 mounted on a shaft 128, opposite ends of the shaft being journaled in bearings, one bearing being indicated at 129. In this embodiment, all of the components of the power system are mounted within the housing 120 of the power tool in close proximity to the motor. The various transistors and the full-wave bridge are mounted in a single package designated 130. One of the larger capacitors is indicated at 131. The miscellaneous capacitors and resistors may be mounted in accordance with space requirements within the housing 120.

In the embodiment of the invention illustrated in FIG. 5, all of the electronic components are mounted in a cylindrical housing 133 at one end of a tubular member 134 forming part of a vibrating tool, generally designated 135. It will be understood that the vibrating member 135 which is designed for use in concrete work, includes an eccentric member 135a connected by suitmeans with the rotor of the induction-type motor 135b for being driven thereby. In this arrangement, one of the larger capacitors is indicated at 136. The transistors are mounted on opposite sides of a partition plate 137. The power tool assembly illustrated in FIG. 5 includes a cord 138 extending to a conventional plug 139 mounting a ground prong 140 and a pair of prongs 141.

Another power system arrangement is illustrated in FIGS. 9 and 10. It operates in essentially the same manner as the aforedescribed system, the main difference being that frequency generator does not include a separate transformer. The various transformer coils are wound on the stator of the motor itself in induction relation with the stator windings, and therefore a portion of the stator actually serves as a transformer core. In FIG. 9, the various components corresponding to the aforementioned components in FIG. 6 are indicated by the prime form of numeral.

Referring now to FIG. 9, stator winding 29' consists of series connected windings 145–148, inclusive. Similarly, stator winding 30' consists of series connected windings 150 through 153. Finally, stator winding 31' includes series connected windings 155-158, inclusive.

Transistor 33' is biased either on or off by series connected coils 160 and 161, connected between the base of transistor 33' and the line 35'. Likewise, transistor 34' is controlled by coils 162, 163 connected in series between the base of such transistor and the D.C. line 17'. Series connected coils 165, 166 extend between the base of transistor 44' and the line 46', and in like manner, coils 168 and 169 are arranged in series between the base of transistor 45' and the line 17'. Transistor 56' is controlled by coils 170 and 171 connected in series between the base of this transistor and the line 58'. Finally, transistor 57' is controlled by windings 172, 173 connected in series between the base of transistor 57' and the line 17'. A starting circuit includes a starting coil 174 in a line between the input lines 16', 17', which line also includes a diode 175 in addition to the capacitor 94' and resistor 95'. Such starting circuit may include a reverse starting coil and the forward and reverse starting switches as in FIG. 6. The prime and double prime markings in FIG. 9 indicate the ends of the windings.

FIG. 10 diagrammatically illustrates the locations of the various windings on a stator 176 of an induction motor of the type referred to herein, the ends of the windings being indicated by the prime and double prime form of numeral. As mentioned above, the operation of this system in generating alternating current in the proper phase relation in the motor stator is the same as the operation of the system of FIG. 6. For a more detailed explanation of the operation of the frequency generator of the FIGS. 9 and 10 power supply arrangement, reference should be had to the aforementioned Gawron application.

The system of FIGS. 9 and 10, in not requiring a a separate transformer, readily lends itself to compact installation in portable electric tools where space limitations are stringent. It will be understood that the power system of this invention can be readily adapted for installation in the various power tool assemblies shown in FIGS. 1–5 and other portable, electrically powered devices when space, weight or size requirements are important.

It will be appreciated that the power system of this invention provides an entirely new concept in portable electric tool design. Tools embodying the present invention have the advantages of electrically powered tools and have performance, size and operational characteristics comparable to pneumatically operated tools. The motor of the power system, which includes what may be termed a universal brushless motor as explained above, provides for longer life because of the absence of brushes and a commutator. The frequency generator forming part of the present invention generates a polyphase, high frequency alternating current in the stator windings from either a D.C. or A.C. line input current of lower frequency. The power system provides a tool with high efficiency at the smallest possible size, and more desirable speed-torque characteristics. The motor of this system obviates a wire wound armature, and permits the use of a rotor of more or less solid type construction and of minumum size. This power system provides high speeds, sparkless operation and permits obtaining desired frequencies over a relatively wide range.

While the invention has been shown in but only several different forms, it will be obvious to those skilled in the art that it is not to be so limited. On the contrary, the invention is susceptible of various forms and modifications without departing from the spirit and scope of the appended claims.

We claim:

1. In a portable electric tool assembly including a portable electric tool, an electric plug unit, and an elongated flexible member connecting the former with the latter and serving at least to carry a plurality of electric conductors, a power system comprising:
  (a) an induction-type electric motor mounted in the housing of said tool, which motor includes at least two sets of stator coils defining an inductive load;
  (b) a frequency generator interacting with said stator coils for generating therein a polyphase, high frequency, alternating current from line input current;
  (c) said frequency generator including at least two pairs of solid state switch devices, corresponding ends of said sets of stator coils being connected to respective pairs of said switches at a common point between each pair of such switches, said stator coils being connected with said frequency generator only at their respective ends thereby to achieve substantially 100% utilization of such stator coils, the switch devices of each pair of solid state switch devices being arranged to operate in push-pull relation for generating said alternating current and for achieving phase displacement solely by the sequence of switching of said solid state switch devices;
  (d) said frequency generator also including saturable core transformer means for controlling the sequence of switching of said switch devices; and
  (e) all of the components of said power system being mounted within said assembly.

2. The improvement according to claim 1 wherein said transformer means includes control coils mounted on the stator of said motor in inductive relation with the stator coils.

3. The improvement according to claim 1 wherein said transformer means constitutes the sole means for controlling the sequence of switching of said switch devices and serves to synchronize and space the phases of alternating current in said stator.

4. The improvement according to claim 1 wherein certain of the components of said frequency generator are mounted within said tool housing and wherein the remainder of the components thereof are mounted within said plug unit.

5. The improvement according to claim 1 wherein all of said power system components are mounted within the tool housing.

6. The improvement according to claim 1 wherein all of the components of said frequency generator are mounted within said plug unit.

7. The improvement according to claim 1 wherein said tool consists of an elongated vibratory member, wherein said flexible member is defined in part by a tubular extension of the tool housing and by an electric cord, and wherein all of the components of said frequency generator are mounted within said tubular portion.

8. The improvement according to claim 1 wherein each of the switch devices comprises a transistor.

9. An electrical power system for a hand manipulatable power tool assembly, which assembly includes a hand manipulatable power tool having a housing, an electric plug unit for connection with line A.C., and an elongated flexible member connecting the tool and the plug unit and serving at least to carry a plurality of electrical conductors, said system comprising; an induction-type motor in said housing for operating said tool, which motor includes at least two sets of stator coils defining an inductive load; rectifying means for converting the aforementioned line current to D.C., a frequency generator for generating, from the aforementioned D.C., high frequency, polyphase A.C. in said sets of stator coils of said motor, said frequency generator including at least two pairs of solid state switch devices, corresponding ends of said sets of stator coils being connected to respective pairs of said switch devices at a common point between each pair of such switches, said stator coils being connected with said frequency generator only at their respective ends thereby to achieve substantially 100% utilization of said stator coils, the switch devices of each pair of such devices being arranged in push-pull relation for generating said polyphase A.C. and for achieving phase displacement solely by the sequence of switching of said switch devices, said frequency generator also including saturable core transformer means for controlling the sequence of switching of said switches; all of the components of said power system being mounted in said power tool assembly.

10. The improvement according to claim 9 wherein said transformer means includes control coils mounted on the stator of said motor in inductive relation with the stator coils.

11. The improvement according to claim 9 wherein said transformer means constitutes the sole means for controlling the sequence of switching of said switch devices and serves to synchronize and space the phases of alternating current in said stator.

12. The improvement according to claim 9 wherein certain of said power system components are mounted within said tool housing and wherein the remainder of said components are mounted within said plug unit.

13. The improvement according to claim 9 wherein all of the components of said power system are mounted within the tool housing.

14. The improvement according to claim 9 wherein all of the components of said frequency generator and rectifying means are mounted within said plug unit.

15. The improvement according to claim 9 wherein said tool consists of an elongated vibratory member, wherein said flexible member is defined in part by a tubular extension of the tool housing and by an electric cord, and wherein all of the components of said frequency generator and rectifying means are mounted within said tubular portion.

16. The improvement according to claim 9 wherein each of said switch devices comprises a transistor.

References Cited

UNITED STATES PATENTS

| 2,970,301 | 1/1961 | Rochelle | 340—183 |
| 3,175,167 | 3/1965 | Lloyd | 318—138 XR |
| 3,221,192 | 11/1965 | Franklin | 318—345 XR |
| 3,297,928 | 1/1967 | Von Delden | 318—138 |
| 3,321,687 | 5/1967 | Toth | 318—138 |
| 3,327,196 | 6/1967 | Sahrbacker | 318—345 |

ORIS L. RADER, Primary Examiner

G. RUBINSON, Assistant Examiner

U.S. Cl. X.R.

318—138, 345; 321—8